Aug. 25, 1970     H. R. MONTAGUE     3,525,882
RECTIFIED POWER SUPPLY CIRCUIT PROVIDING VARIABLE TERMINATION
DURING HALF CYCLE CONDUCTION USING ZERO CROSSING TURN
ON AND COMMUTATION TURN OFF METHODS
Filed May 25, 1967

INVENTOR

HERBERT R. MONTAGUE

United States Patent Office 3,525,882
Patented Aug. 25, 1970

3,525,882
RECTIFIED POWER SUPPLY CIRCUIT PROVIDING VARIABLE TERMINATION DURING HALF CYCLE CONDUCTION USING ZERO CROSSING TURN ON AND COMMUTATION TURN OFF METHODS
Herbert R. Montague, 75 Clifton Blvd., Binghamton, N.Y. 13908
Filed May 25, 1967, Ser. No. 641,324
Int. Cl. H03k 17/00
U.S. Cl. 307—252                                   6 Claims

ABSTRACT OF THE DISCLOSURE

Phase-controlled power supply circuits employing semiconductor devices in which current conduction always commences at the start of a half cycle and is variably controlled to terminate conduction during that half cycle.

BACKGROUND OF THE INVENTION

Heretofore, variable phase controlled D.C. power supplies have been constructed in which conduction is initiated at a variable firing angle in a rectified half wave but the conduction is terminated at the conclusion of the half cycle when the voltage reaches zero. This operation was conventional with gas-filled thyratrons and continued with the advent of controlled rectifier semiconductor devices.

Although the conventional design provides a stepless D.C. output voltage over substantially the full half wave, such a supply circuit has the inherent disadvantage of creating energy surges with accompanying, disruptive line transients. A reduction of the resulting interference necessitates the addition of expensive and heavy filters for the power supply and additional filters for other circuits within the affected range. The bulky and heavy filter networks are particularly evident in power supplies of one kilowatt and greater. Because of these energy surges, the supply circuits have required components with peak ratings far beyond those actually necessary to handle the power demands of the application and add significantly to the circuit cost.

It is therefore a primary object of this invention to provide a variable direct current phase-controlled power supply having a constant firing angle to start conduction at substantially zero voltage in each half cycle but which can be switched off to terminate conduction at any desired phase angle thereafter within the half cycle.

It is another object of this invention to provide a direct current phase-controlled power supply having improved efficiency and requiring less expensive filter networks.

A further object of this invention is to provide a direct current phase-controlled power supply circuit that is readily adapted to output power capacities over a wide range of demand and capable of use on single or multiple phase power sources.

SUMMARY OF THE INVENTION

The foregoing objects are attained in accordance with this invention by providing rectifying means connected to a source of alternating current to produce half cycles of single polarity voltage varying between zero and a predetermined maximum which are, in turn, connected across a load. A first controlled rectifier means is connected in series with a load which is gated into conduction by zero crossover circuit means at substantially zero voltage at the beginning of each half cycle of rectified voltage. Connected in parallel with the load and first controlled rectifier means is a commutating means including a second controlled rectifier which is selectively gated into conduction by variable phase-control means to momentarily reverse current flow in the first controlled rectifier means, whereby the latter is turned off to block the flow of load current.

This invention has the advantage of initiating load current at approximately zero potential rather than to suddenly gate on current at significantly high potential as is experienced by conventional phase-controlled circuits. Because of the gradual current increase coincidentally with the voltage increase, the circuit requires components having peak ratings no higher than the maximum RMS value to be experienced. The circuit action thus further reduces high frequency transients which heretofore have created interference during the use of phase-controlled supply circuits.

These and other objects, features and advantages will become apparent from the following, more detailed description of preferred embodiments of the invention, given by way of example, with reference to the accompanying drawing.

DESCRIPTION OF THE PREFERRED EMBODIMENTS

Figure 1:
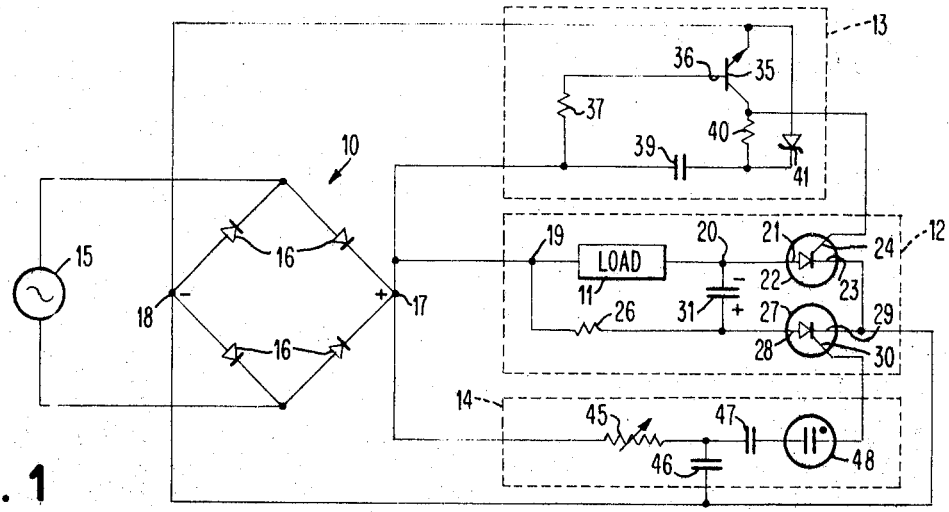
FIG. 1 is a schematic diagram of one embodiment of a power supply circuit incorporating the features of the invention.

Referring to FIG. 1 the power supply of the invention comprises generally a full wave bridge rectifier circuit 10, a load 11 in commutating circuit 12, a zero crossover firing circuit 13 and a phase-control circuit 14. The bridge rectifier circuit 10 is connected across a suitable source 15 of alternating current and includes four diodes 16 connected in the conventional manner and poled to provide direct current positive and negative polarities at respective output terminals 17 and 18.

Positive terminal 17 is connected to input terminal 19 of load 11 and output terminal 20 of the load is connected to anode 21 of a gate controlled rectifier 22. Cathode 23 of the controlled rectifier is, in turn, connected to negative terminal 18 of the bridge circuit. All load current is controlled by the conduction of rectifier 22 when fired by an appropriate signal on gate 24.

Interconnected in parallel with load 11 and primary rectifier 22 is a circuit comprising resistor 26 and secondary gate controlled rectifier 27. Resistor 26 is a current limiting resistor and is connected between load terminal 19 and anode 28 of controlled rectifier 27. Cathode 29 of controlled rectifier 27 is connected in common with that of rectifier 22 to negative supply terminal 18. A commutating capacitor 31 is connected across the anodes 21 and 28 of both the primary and secondary controlled rectifiers.

The gating signal for primary controlled rectifier 22 is generated by zero crossover firing circuit 13 which is controlled by transistor 35. Base 36 of the transistor is connected with the positive terminal 17 through resistor 37 and the emitter is connected to negative terminal 18. The collector is coupled to the base through capacitor 39 and resistor 40. A Zener diode 41 is connected from the emitter across the transistor and resistor 40 to capacitor 39. The collector is connected directly to gate 24 of primary controlled rectifier 22.

The gating signal for firing controlled rectifier 27 is produced by phase-control circuit 14. Variable resistor 45 is connected to positive terminal 17 of the rectifier bridge and to one side of capacitor 46, the other side of which is connected to negative terminal 18. Resistor 45 and capacitor 46 form a variable RC network. Connected to the junction of resistor 45 and capacitor 46 is a blocking capacitor 47 in series with one terminal of neon discharge lamp 48 which has its other terminal connected with gate 30 of controlled rectifier 27.

Figure 2:
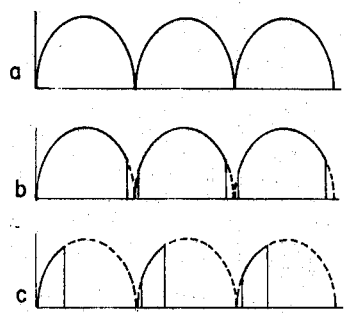
FIGS. 2a, 2b and 2c are wave form diagrams of input load voltage and load current illustrating operating characteristics of the circuit in FIG. 1.

In operation, alternating current is supplied across full wave rectifier bridge 10 to produce at terminal 17 successive, positive half cycles of voltage varying between zero and a predetermined maximum, dependent upon source 15. The rectified supply voltage is shown in FIG. 2a.

At the time terminal 17 is substantially zero voltage, transistor 35 terminates conduction and the voltage at the collector then increases. This positive-going voltage serves as a gate signal and turns on primary controlled rectifier 22. At all other times, the voltage at the collector terminal is essentially zero.

During the conduction of rectifier 22, the potential drop across load 11 produces current flow across current-limiting resistor 26 to charge capacitor 31. The charge on the capacitor builds up in accordance with the voltage at terminal 17 because controlled rectifier 27 is blocked in the absence of a positive signal at gate 30. Primary controlled rectifier 22 continues conduction until its current flow is reversed. Reverse current sufficient to turn off primary rectifier 22 is obtained by selectively gating on secondary rectifier 27. Capacitor 31 then momentarily produces a heavy current flow in a forward direction through rectifier 27 and in a reverse direction through rectifier 22 to extinguish the latter.

During the charging of capacitor 31, the RC network of variable resistor 45 and capacitor 46 is also charging, but at a rate selectively controlled by the setting of resistor 45. At the time the voltage becomes sufficient to fire neon tube 48, then the resulting pulse also fires secondary controlled rectifier 27, allowing reverse current to flow in primary controlled rectifier 22 and blocking conduction of the latter. This action terminates the load current. Controlled rectifier 27, however, when turned on, continues its conduction until the end of the present half wave. While rectifier 27 is conducting, capacitor 31 charges oppositely to that shown and thus produces a reverse current in rectifier 27 when rectifier 22 fires. The signal to gate 30 will have been turned off prior to that time since the firing signal is merely a short pulse because of blocking capacitor 47. By appropriately varying the time constant of the RC network with resistor 45, the firing of rectifier 27 can be selectively initiated over a wide range of firing angle during each half cycle, so that current wave forms through load 11 can vary such as those shown in FIGS. 2b and 2c.

The supply circuit of the invention can readily be installed on a multi-phase power supply. Each phase is connected in parallel across the load and can have its own rectifier, zero crossover and phase-control circuits.

Figure 3:
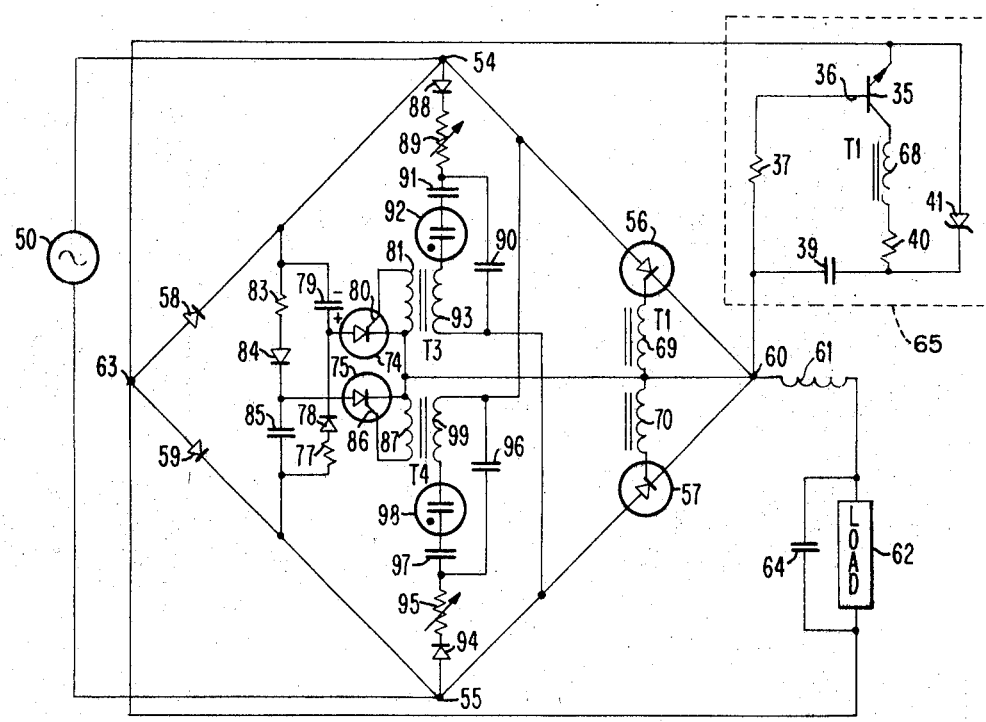
FIG. 3 is a schematic diagram of a power supply circuit according to a second embodiment incorporating the features of the invention.

In FIG. 3 there is shown a second embodiment of the invention. In this circuit, two primary gate controlled rectifiers are used in conjunction with a pair of diodes to provide a full wave bridge rectifier and each of a pair of secondary gate controlled rectifiers is used to commutate a respective one of the primary controlled rectifiers. In addition, the firing signals are provided through transformer couplings. This circuit offers the advantages of load isolation and additional power capacity because of the parallel-connected primary controlled rectifiers. The latter parallel connection also permits each primary rectifier to be adjusted to a different cut-off time, if desired.

In the circuit of FIG. 3, alternating voltage is supplied from source 50 to a full wave bridge rectifier at input terminals 54, 55 which is comprised of primary gate controlled rectifiers 56 and 57 and diodes 58 and 59, each poled as shown. Positive output terminal 60 is connected to load 62 through optional inductor 61, and the other load terminal is, in turn, connected to negative output terminal 63. Inductor 61 and capacitor 64 provide an optional filter circuit.

Primary controlled rectifiers 56 and 57 are each fired from zero crossover circuit 65. The crossover circuit is identical to that described with regard to FIG. 1, and like components are identified with the same reference numerals with the exception that transformer T1 replaces the former connection between the transistor collector and a controlled rectifier gate. Firing signals are transmitted to primary controlled rectifier gates each half cycle via secondary windings 69, 70 of transformer T1, connected between a respective controlled rectifier gate and positive output terminal 60.

Secondary controlled rectifiers 74 and 75, when fired, each turn off respective primary controlled rectifiers 56 and 57. The secondary rectifiers are each supplied through identical charging circuits. The charging circuit for rectifier 74 includes limiting resistor 77 connected between bridge input terminal 55 and diode 78 which is, in turn, connected with commutation capacitor 79. The capacitor is connected to the other bridge input terminal 54. The anode of secondary controlled rectifier 74 is connected to the diode-capacitor junction while the cathode is connected to positive output terminal 60. The gate 80 of secondary rectifier 74 is connected to one end of transformer secondary winding 81 of transformer T3 which is connected at its other end also to positive terminal 60. The charging circuit for secondary controlled rectifier 75 is similar to that for rectifier 74 and includes the series circuit of resistor 83, diode 84 and commutation capacitor 85. The gate 86 of secondary rectifier 75 is connected with one end of secondary winding 87 of transformer T4 and the other end of the winding is connected at positive output terminal 60.

Each secondary controlled rectifier 74, 75 is gated by a positive pulse from a respective variable phase-control circuit. The phase-control circuit for rectifier 74 is similar to that of FIG. 1, and comprises diode 88, variable resistor 89, and charging capacitor 90 connected in series between input terminals 54 and 55. Connected in parallel with capacitor 90 is a series circuit of blocking capacitor 91, neon lamp 92 and primary winding 93 of transformer T3. The phase-control circuit for secondary rectifier 75 comprises diode 94, variable resistor 95 and charging capacitor 96. A series circuit of blocking capacitor 97, neon lamp 98 and primary winding 99 are connected in parallel with capacitor 96.

In operation, the supply voltage from source 50 produces an alternating voltage at input terminals 54, 55 to the bridge circuit. No current flow occurs, however, until one of the primary controlled rectifiers is gated on by a signal from zero crossover circuit 65. The operation of the zero crossover network is the same in this embodiment as in that described above. The gating signals, however, are produced by transformer T1. Once fired, load current continues to flow through the primary controlled rectifier until terminated by firing of its respective secondary controlled rectifier.

The termination of primary rectifier current is accomplished upon discharging commutating capacitor 79 or 85 by gating the proper secondary controlled rectifier 74 or 75 when its respective primary controlled rectifier is conducting. Capacitors 79 or 85 are each charged in the preceding half cycle. For example, assume terminal 55 is in the positive half cycle. Current then flows through limiting resistor 77, diode 78 and charges capacitor 79, connected to the anode of secondary rectifier 74. The phase-control firing circuit for rectifier 74 is reverse biased because of diode 88 so that no firing signal is generated for rectifier 74. During the following half cycle when input terminal 54 is positive and primary rectifier 56 is conducting, the phase-control circuit including diode 88 is forward-biased to charge the RC network of variable resistor 89 and capacitor 90 in accordance with the pre-adjusted time constant. When neon 92 reaches the breakdown voltage, a positive firing signal is generated in primary winding 93 and induced in secondary winding 81 to gate rectifier 74 into conduction. Current momentarily flows from capacitor 79 through secondary controlled rectifier 74, positive output terminal 60 and in a reverse direction through the conducting primary controlled rectifier 56 to terminal 54 and to capacitor 79. The capacitor, in discharging, supplies sufficient reverse current through the primary rectifier to cause it to shut off. Thus by appropriately varying the RC time constant, rectifier 56 can be terminated as desired over nearly the entire half cycle as shown in FIGS. 2b and 2c. Once fired, the secondary rectifier continues to conduct through the load until capacitor 79 is discharged at which time rectifier 74 turns off.

During the time terminal 54 is positive, capacitor 85 is charging through resistor 83 and diode 84 in preparation for turning off primary controlled rectifier 57 in the following half cycle. When terminal 55 becomes positive and primary rectifier 57 is conducting, the phase-control circuit of diode 94, variable resistor 95 and capacitor 96 supplies the firing signal for secondary controlled rectifier 75. Primary rectifier 57 is then turned off in the same manner as was rectifier 56 in the preceding half cycle.

Although the zero crossover circuits and phase-control circuits have been shown coupled to their respective controlled rectifiers through transformers, these circuits can optionally be directly connected. The transformers merely provide isolation and are used if desired. It will also be all noted that the circuit may readily be modified for half wave operation instead of the full rectification as shown.

From the foregoing description, it can be seen that conduction across a load during each half wave of supply potential regularly occurs near zero voltage and can be terminated thereafter as desired. By starting load current at substantially zero volts, no initial heavy conduction shock occurs so that high frequency transients do not occur. Furthermore, the gradual buildup of load voltage provides a more efficient power consumption because the available current more closely matches the load requirements.

While there have been shown and described particular embodiments of the invention, it will be apparent that various modifications and improvements can be made therein without departing from the spirit and scope of the invention as defined in the appended claims.

What I claim is:
1. A circuit for supplying variable direct current power to a load from an alternating current source comprising:
 (a) a rectifier adapted to be connected across alternating current source and providing a rectified output voltage,
 (b) a commutating circuit connected in series with said load and the output of said rectifier,
 (c) a zero-crossing circuit connected to said commutating circuit to cause said commutating circuit to begin supplying a power pulse to said load at the beginning of each half cycle of the rectified output voltage,
 (d) a variable phase-control circuit connected to said commutating circuit to cause said commutating circuit to selectively terminate the power pulse to said load at a predetermined point during each half cycle of the rectified output voltage.

2. Apparatus as described in claim 1 wherein said commutating circuit includes a first gate controlled rectifier device connected in series with said load and said first device being connected across said rectified output voltage, a second gate controlled rectifier device being connected in parallel with said first device and said load, and a conduction commutating capacitor connected between said first and second devices for terminating conduction in either of said first and second devices.

3. Apparatus as described in claim 2 wherein said variable phase-control circuit comprises a breakdown device conducting at a predetermined voltage and providing a gating pulse to said second gate controlled rectifier device, and a resistor-capacitor network having a variable time constant for selectively determining the cycle time for conduction of said breakdown device.

4. Apparatus as described in claim 1 wherein said rectifier includes a pair of parallel-connected supply circuits each having a gate controlled rectifier device therein, and a said variable phase-control circuit for each said rectifier device independently selectable to different values of said predetermined point for terminating said current flow.

5. A circuit for supplying variable direct current power to a load from an alternating current source comprising,
 (a) a bridge rectifier having a pair of input terminals connected to said alternating current source and a pair of output terminals connected to said load, said bridge rectifier including
  (1) first and second diodes connected in common to one of said output terminals and to respective ones of said input terminals, and
  (2) first and second gate controlled rectifier devices connected in common to the other of said output terminals and to respective ones of said input terminals,
 (b) a zero-crossing circuit having its input connected across said output terminals and its output connected to the gates of said first and second gate controlled rectifier devices to alternately cause said devices to begin supplying a power pulse to said load at the beginning of each half cycle of the rectified voltage appearing across said output terminals, and
 (c) variable phase-control means connected across each of said first and second gate controlled rectifier devices to alternately cause said devices to selectively terminate the power pulse to said load at a predetermined point during the half cycle of the rectified voltage appearing across said output terminals.

6. A circuit as described in claim 5 wherein said variable phase-control means comprises first and second phase-control circuits independently selectable to terminate the power pulse to the load at different predetermined points during alternate half cycles of the rectified voltage.

References Cited

UNITED STATES PATENTS 3,335,360   8/1967   Reinert _____ 323—22

OTHER REFERENCES

The Silicon Controlled Rectifier Manual, March 1964, pp. 125 and 139.

DONALD D. FORRER, Primary Examiner

J. D. FREW, Assistant Examiner

U.S. Cl. X.R.
307—305; 323—22